Nov. 13, 1934.   P. OKEY   1,980,956

WEIGHING SCALE

Filed April 15, 1930

INVENTOR.
Perry Okey.

BY
Edwin P. Corbett
ATTORNEYS.

Patented Nov. 13, 1934

1,980,956

UNITED STATES PATENT OFFICE 1,980,956

WEIGHING SCALE

Perry Okey, Columbus, Ohio, assignor to The Exact Weight Scale Company, Columbus, Ohio, a corporation of Ohio Application April 15, 1930, Serial No. 444,563

13 Claims. (Cl. 265—49)

My invention relates to weighing scales. It pertains, more particularly, to those types of scales which embody a beam and a weight movable along this beam for the purpose of counterbalancing the commodity being weighed, although it is not necessarily limited to these types of scales.

In prior weighing scales of the types indicated, it has been customary to effect movement of the weight or weights along the beam by manual impulse directly applied to the weight. Such structures have certain disadvantages, among which are the temporary inaccuracy produced by the weight of the hand or the pressure applied thereby to the beam and the delay occasioned in obtaining the proper balancing action. Some effort has been made to accomplish this shifting of the weight by electrical means but the means previously utilized have been comparatively costly and complicated.

One of the objects of my invention is to provide a weighing scale wherein the weight may be adjusted along the beam without applying the hand of the operator to the weight. Another object is to accomplish this result by means of a simple and inexpensive structure which will operate with certainty and precision and which may be adjusted to move the weight to a position to effect a proper balance condition in a minimum period of time and with a minimum effort on the part of the operator.

My invention preferably contemplates the provision of a weight structure which is movable along the beam by means of a slide member which is not mounted upon the beam but which, in its movement, subjects the weight structure to magnetic forces which cause such weight structure to move to a selected position. This slide member is preferably slidably mounted upon a calibrated bar which is disposed substantially parallel with the scale beam and the slide may be provided with an indicator for cooperation with the calibrations to indicate the weight of the commodity.

My invention may comprise a weight carriage having one or more magnetic members thereon which are disposed in cooperative relation to one or more magnetic members upon the slide member carried upon the calibrated beam. In one form that I have shown, the poles of the respective magnets are so disposed that a repulsion result which maintains the weight under the control of the slide without physical contact therewith. In another form, the poles of the respective magnets used are so disposed that an attraction results to accomplish this same purpose. With either form, I may utilize a lost motion device to effect most of the movement of the weight by physical means, while depending upon the magnetic system to finally center the weight in correct position.

The preferred embodiment of my invention is shown in the accompanying drawing wherein similar characters of reference designate corresponding parts and wherein.

Figure 1:
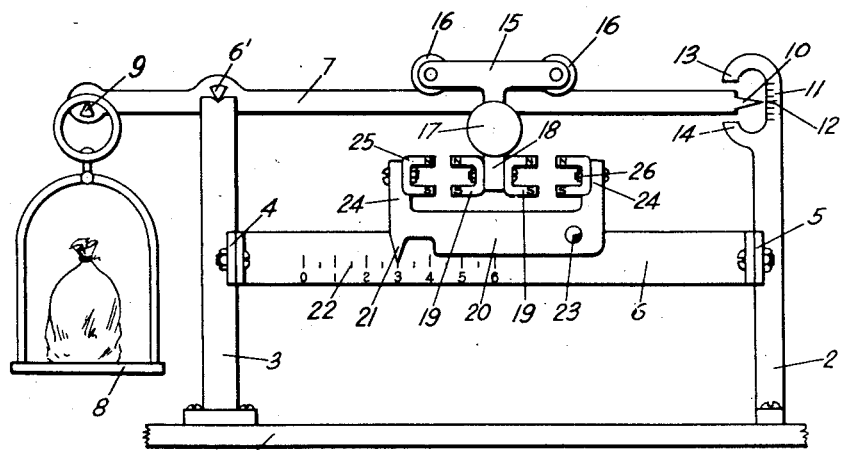
Figure 1 is a front elevation of that form of my invention which relies upon repulsion to actuate the weight structure.
Figure 3:
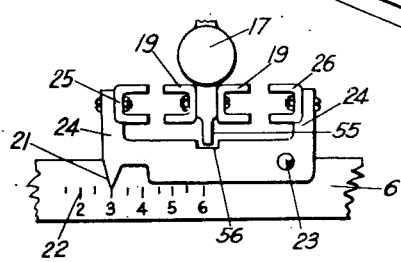
Figure 3 is a detailed view illustrating a modification which I may make in the type of structure shown in Figure 1 to produce a structure wherein the weight is moved partly by the repulsion action and partly by physical contact between my weight structure and slide.

In Figures 1 and 3 of the drawing, I have shown a scale frame comprising a base 1 with an upright or standard 2 adjacent one end thereof and with an upright or standard 3 adjacent the opposing end thereof. These standards may be bolted or otherwise secured to the horizontal base and extend upwardly therefrom. As shown, they are provided with extensions 4 and 5 for the support of a horizontal calibrated bar 6. This bar is securely bolted at its opposing ends to these extensions and is preferably in substantial parallelism with the scale beam which is to be described.

The upper end of the standard 3 is preferably bifurcated and is provided with suitable bearing surfaces for the reception of the knife edged trunnions 6' of an off-center scale beam 7. Suspended from the short arm of this beam is a load pan 8 which is likewise supported by knife edged bearings 9.

The long arm of the beam 7, at its free end, may be provided with a pointer 10 designed to cooperate with an indicating dial 11, having a center line marking 12 thereon. The dial 11 is preferably carried upon the upper end of the standard 2 and is so formed adjacent the upper end thereof as to provide the stops 13 and 14 for limiting the up or down movement of the free end of the long arm of the beam 7.

Mounted on the long arm of the beam 7 is a weight carriage 15 that is equipped with roller members 16 mounted on opposing ends thereof and adapted to contact with and roll along the upper horizontal surface of the beam. This carriage carries a weight 17 and is also equipped with the centrally disposed downwardly extending arm 18 designed to carry magnets 19 on the lower end thereof. The magnets are preferably U-shaped and are mounted back to back on the lower end of the extension 18. They are disposed between magnets that are carried by a slider 20.

This slider, which preferably takes the form shown, is mounted on the horizontal bar 6 and is equipped with a pointer 21 adapted to cooperate with the calibrations 22 and with a handle 23 for ready actuation thereof. Furthermore, the upper surface of this slider is equipped with the upstanding extensions 24 formed integrally therewith and positioned adjacent each end thereof.

These extensions are adapted to carry the magnets 25 and 26, that are also U-shaped, having their open ends facing toward one another. It will be apparent, that the open end of the magnets 19 will face the open ends of the magnets 25 and 26. The poles of these respective magnets have been lettered, as shown, and this arrangement is such that the similar poles of opposing magnets face each other. That is, the north poles of the magnets 25 and 26 face the north poles of the magnets 19. The repulsion resulting from this arrangement develops a continuous effort on the part of the magnets 19 suspended from the carriage 15 to maintain equal lengths of gaps between the magnets 25, 26 and the magnets 19 and, therefore, to maintain the magnets 19 accurately centered intermediate the magnets 25 and 26 carried by the slider. Thus, a definite positional relation between the weight 17 formed as a part of the carrier 15 and the slider is attained.

In operation with the structure shown in Figure 1, the commodity suspended from the short arm of the scale beam is weighed by moving the slider 20 to the right along the calibrated bar 6. The repulsion between the magnet 25 and the magnet 19 which faces it will cause the weight carriage to be rolled along the beam and this rolling action may be continued until a balanced condition it attained. At this time, the beams should balance and the weight of the article should be indicated by the pointer 21. If, the article should be slightly under or over weight, the pointer 10 will not register with the mark 11 and further adjustment of the slider 20 or the amount of the commodity will be necessary.

Figure 2:
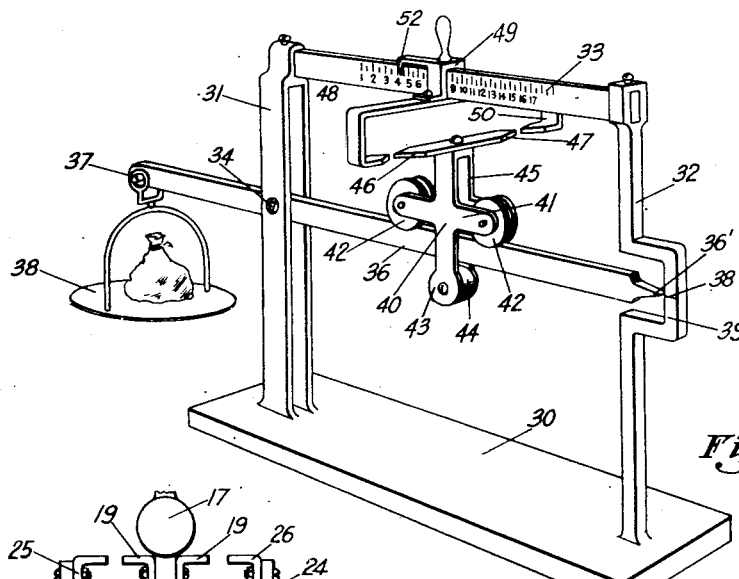
Figure 2 is a perspective view of that form of my invention which relies upon magnetic attraction to actuate the weight structure.

With reference to Figure 2, I have shown the apparatus which I preferably utilize when I center the weight carriage by means of magnetic attraction.

This apparatus preferably comprises a scale frame having a base 30 equipped with an upright 31 adjacent one end thereof and an upright 32 adjacent the opposing end thereof. A calibrated bar 33 is securely bolted at its opposing ends to the respective upper ends of these standards.

The standard 31 is bifurcated as shown, and is provided with oppositely disposed aligning openings 34 intermediate the length thereof. These openings are adapted for the reception of the knife-edge trunnions disposed on opposing sides of the off-center beam 36. The short arm of the beam is also equipped with knife-edge trunnions 37 from which is suspended a weight pan 38.

The long arm of the beam 36, at its free end, is provided with a pointer 36' adapted to register with a center line mark 38 formed on the vertical section of a U-shaped portion 39. This U-shaped portion is formed integrally with the standard 32 and its legs limit the up and down movement of the outer end of the beam.

Mounted on the long end of the beam 36 is a wheeled carrier 40 having a horizontal portion 41 equipped with rollers 42 adapted to contact with and roll along the upper horizontal surface of the beam. This carrier is also provided with a pair of oppositely disposed depending arms 43 between which is located a weight member 44 normally carried below the long arm of the off-center beam.

The oppositely disposed arms 45 that are integrally formed with the carrier 40 and extend upwardly therefrom are adapted to carry a bar 46 extending at right angles thereto. This bar may either take the form of a bar magnet having north and south poles or, it may be a soft iron bar if desired. The ends of this bar 46 are wedge-shaped as at 47.

The bar 46 is adapted to lie intermediate the poles of a U-shaped magnet 48 carried by a slider 49 mounted on the calibrated bar 33. This magnet 48 is mounted transversely of the bar 33 and the scale beam 36 and the open ends thereof are turned inwardly as at 50 to align with the ends of the transverse bar 46.

Since the magnet 48 will attempt to maintain the shortest air gap possible between its poles, the bar 46 will remain accurately centered with relation thereto, thus imparting a definite positional relation between the weight 44 and the slider 49. That is, when the pionter 52 indicates a certain weight, the weight 44 will be in such position as to exert the required downward force on the scale beam to equal the weight indicated by the pointer.

In operation, the slider 49 is moved outwardly along the calibrated bar to the desired position, as indicated by the pointer 52 for ascertaining the weight of the commodity on the pan 38. The wheel carrier 41 will roll outwardly along the long arm of the beam and, will assume its position with relation with the slider 49, as determined by the attraction between the soft iron bar 46 and the magnet 48.

For some purposes, it is desirable to move the weight by physical means and depend upon the magnetic system to finally center the weight in correct position. A method and means for accomplishing this is shown in Figure 3, the necessary mechanism being applied to the type of device shown in Figure 1.

In this figure, the weight structure with its magnets thereon is supplemented by a downwardly extending finger 55. This finger projects into a notch 56 in the slide 20. The width of the finger 55 and the notch 56 are so proportioned that their adjacent faces will come into contact upon movement of the slide before the magnets 19 may contact with the magnets 25 and 26. This contact will be followed by movement of the weight structure by a physical pressure from the slide. In operation, the slide may be moved for the greater portion of the desired distance and, after the completion of such movement, the magnet assembly will accurately center the weight structure with relation to the slide.

This particular feature is shown in connection with the type of device shown in Figure 1. It will be readily understood that it may be applied also to the type of device shown in Figure 2.

From this description, it will be apparent that I have provided a weighing scale of extremely simple structure wherein the weight upon the beam may be manually adjusted without physical contact with the weight or without the beam being subjected to manual pressure. Furthermore, the structure of my device is such that it may be produced at a comparatively low cost and will operate with certainty and precision. The slide which I have used to actuate my weight carriage may be adjusted automatically if desired.

Having thus described my invention, what I claim is:

1. A weighing scale comprising a beam, a movable weight on said beam, and magnetic means mounted on said scale and movable substantially parallel to said beam for adjusting the position of said weight on said beam.

2. A weighing scale comprising a beam, a traversable weight on said beam, magnetic material attached to said weight, and magnetic means movably mounted independent of said beam and designed to cooperate with said magnetic material to adjust the position of said weight on said beam.

3. A weighing scale comprising a weight, a beam, means mounted on the scale to move substantially parallel to the beam for traversing said weight along said beam, including magnetic means for effecting final positional adjustment of said weight.

4. A weighing scale comprising a beam, a traversable weight on said beam, magnetic material mounted on said weight, mechanical means for moving said weight on said beam, and a magnetic device movably mounted along with said mechanical means to cooperate with said magnetic material for effecting final positional adjustment of said weight.

5. A weighing scale comprising a beam, a weight, means movably mounted on the scale in cooperative relation with said weight for mechanically traversing the weight along said beam, including magnetic means for final positional adjustment of said weight.

6. A weighing scale comprising a beam, a weight structure movable along said beam, said structure comprising magnetic material, and magnetic means movable in juxtaposition to said beam and so related to said weight structure that movement of said magnetic means will effect movement of said weight structure by magnetic effect without the application of physical force to said weight structure.

7. A weighing scale comprising a beam, a weight structure movable along said beam, said weight structure including magnetic material, and magnetic means movable in juxtaposition to said beam and so related to said weight structure that said weight structure will be magnetically induced to maintain a constant positional relation with said magnetic means.

8. A weighing scale comprising a beam, a weight movable along said beam, a bar in substantial parallelism with said beam, a slide mounted upon said bar, and means whereby movement of said slide will result in movement of said weight, said means being such that said weight may be moved by said slide without mechanical contact therewith.

9. In a weighing scale, a beam, a weight traversable along said beam, magnetic elements attached to said weight, magnetic elements disposed on either side of said first named magnetic elements mounted on said scale for movement in cooperative relation with said weight and adapted to repel said first named magnetic elements.

10. In a weighing scale, an off-center beam, a wheeled carrier mounted on one arm of said beam, a weight carried by said carrier, magnetic elements attached to and carried by said carrier, a bar disposed below said off-center beam, a slider on said bar and magnetic elements adapted to actuate said first-named magnetic elements carried by said carrier.

11. In a weighing scale, a beam, a weight traversable along said beam, and magnetic means disposed on said scale remote from said beam for directly applying magnetic force to said weight to move it along said beam.

12. A weighing scale comprising a beam, a weight structure movable thereon, and a means for moving said weight which is mechanically disconnected therefrom, said means comprising a device movable substantially parallel to said beam and embracing a portion of said weight structure in spaced relation thereto, and magnetic means for maintaining the selected spaced relation therebetween.

13. A weighing scale comprising a beam, a weight structure movable along said beam, and comprising a portion of magnetic material, a bar disposed in substantial parallelism with said beam, a slide movable along said bar, and a means carried by said slide for mechanically moving said weight along said beam and magnetic means projecting into cooperative relation with the magnetic material of said weight structure and exerting a magnetic force thereon.

PERRY OKEY.